Aug. 16, 1966  R. E. ELLIOTT ETAL  3,266,077
SPHERE LAUNCHER
Filed May 24, 1965  2 Sheets-Sheet 1
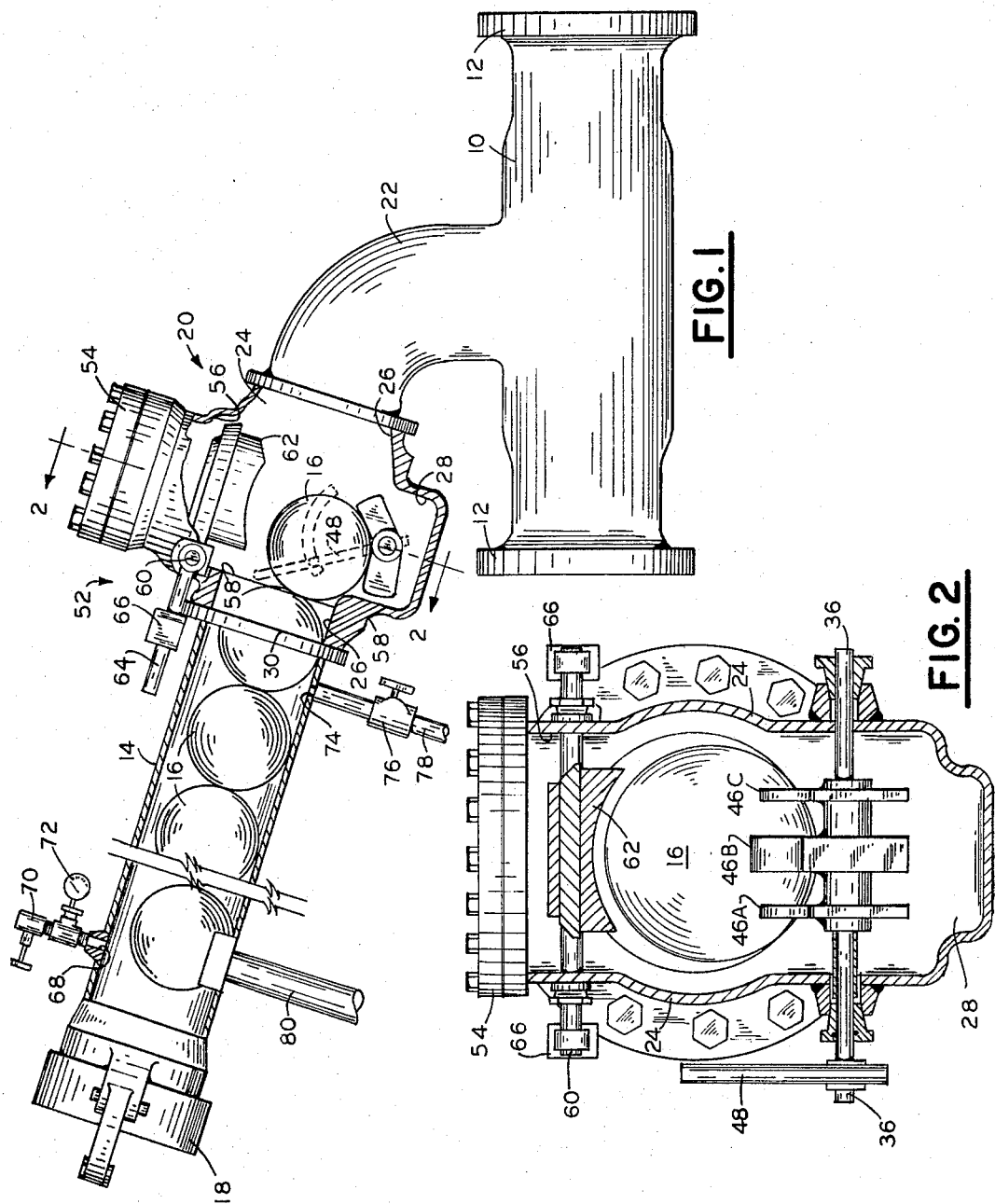
INVENTORS
ROBERT E. ELLIOTT
JERRY W. RIGGS
BY *Head & Johnson*
ATTORNEYS

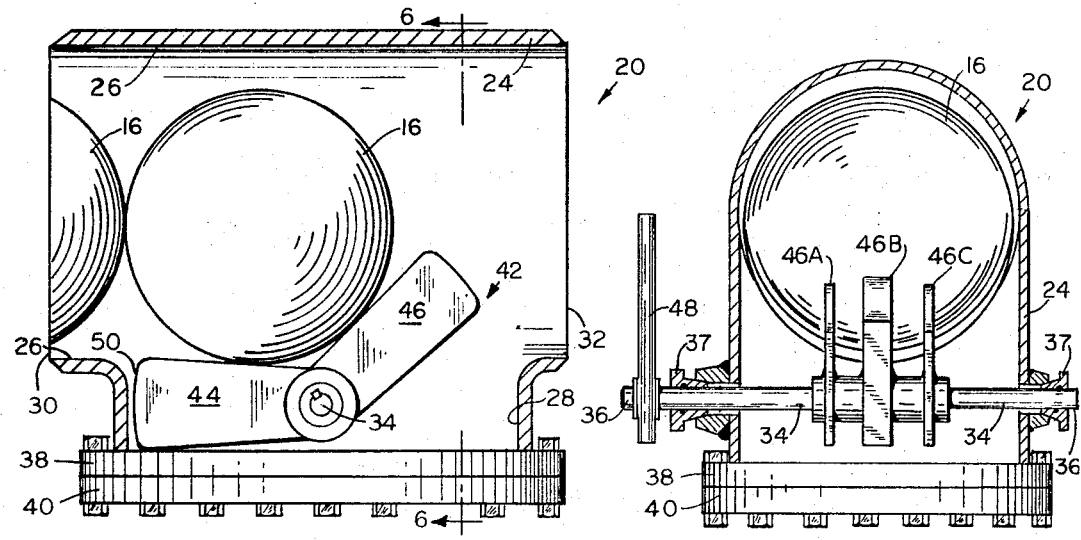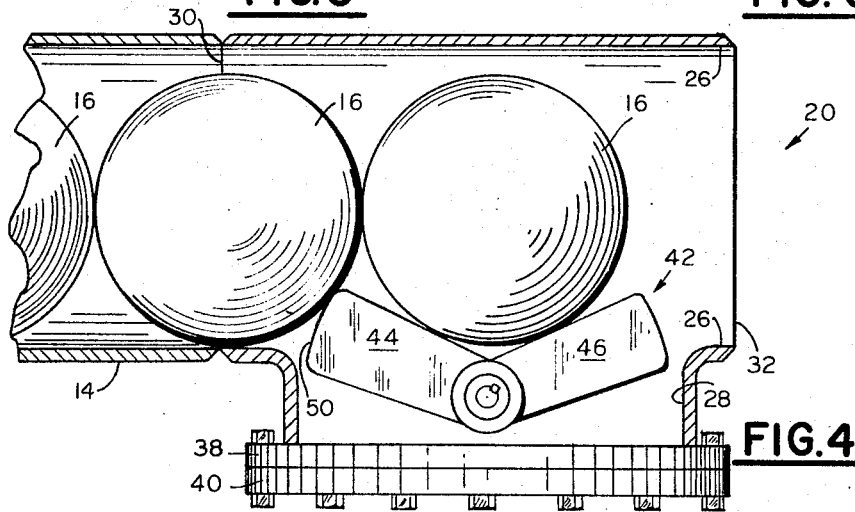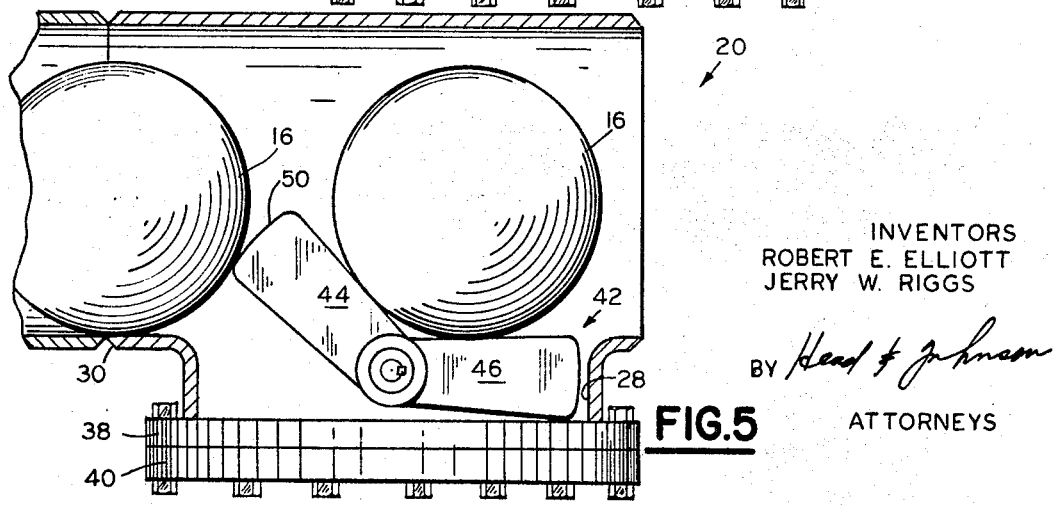

United States Patent Office 3,266,077
Patented August 16, 1966

3,266,077
SPHERE LAUNCHER
Robert E. Elliott and Jerry W. Riggs, Tulsa, Okla., assignors to Frank Wheatley Corporation, Tulsa, Okla., a corporation of Oklahoma
Filed May 24, 1965, Ser. No. 458,057
8 Claims. (Cl. 15—104.06)

This invention relates to a device for launching spheres into a pipeline.

More particularly, the invention relates relates to an improved device for launching spheres into a pipeline characterized by simplicity and dependability. Most particularly the invention provides a unique arrangement wherein a multiplicity of spheres may be stored for sequential launching into a pipeline and wherein each sphere moves forward progressively as each preceding sphere is launched, the spheres never being forced rearwardly.

It is a common practice in the petroleum industry to utilize spheres in pipelines for purposes such as the separation of different types of fluids. A universal practice is to inject spheres into lines to force any collected condensation out of the line. Others have proposed devices for launching spheres into pipelines utilizing a variety of relatively complicated devices. This invention provides a device of utmost simplicity and dependability.

It is therefore an object of this invention to provide an improved device for launching spheres into a pipeline. More particularly, it is object of this invention to provide an improved device for launching spheres into a pipeline characterized by a unique arrangement wherein the spheres may be launched into the pipeline in sequential order in an arrangement wherein the spheres stored for subsequent launching unidirectionally towards the launch chamber.

Another object of this invention is to provide a device for launching spheres into a pipeline including an integral check valve means for closing the storage barrel to permit the filling of the barrel with spheres.

These objects will be fulfilled by an apparatus to be now described. In addition, other objects and a better understanding of the invention will be had by referring to the following description and claims taken in conjunction with the attached drawings in which:

FIGURE 1 is an external side view of a station of this invention for launching spheres into a pipeline.

FIGURE 2 is a cross-sectional view taken along the line 2—2 of FIGURE 1.

FIGURE 3 is a cross-sectional view of a simplified sphere launching device of this invention.

FIGURE 4 is a view essentially as shown in FIGURE 3 showing the sphere launcher in an intermediate position in the process of launching a sphere.

FIGURE 5 is a cross-sectional view essentially as shown in FIGURES 3 and 4 showing the final steps in the launching of a sphere into a pipeline.

FIGURE 6 is a cross-sectional view of the launching device of this invention taken along the line 6—6 of FIGURE 3.

This invention may be described as an improved device for launching spheres into a pipeline. More particularly, but not by way of limitation, the invention may be described as a device for launching spheres into the pipeline comprising a body having a passageway of a diameter to permit free passage of spheres therethrough, the body having a closed lower recess intermediate its length, one end of the body adapted to receive a sphere storage barrel and the other end to connect to a pipeline, a horizontal shaft rotatably supported in the body recess below and substantially in a plane perpendicular the passageway, one end of the shaft extending sealably exteriorly of the body, a cradle member affixed to and pivoted by the shaft within the body, the cradle member having oppositely extending arm portions defining, in a vertical plane of the body passageway axis, an obtuse V, the first leg of the cradle extending towards the end of the body adapted to receive the storage barrel and the second leg of the cradle extending towards the end of the body adapted for connection to a pipeline, the cradle pivoted by said shaft between a first and second extreme position, in the first position the first leg of the cradle lying substantially below the body passageway permitting a sphere to roll onto the cradle and wherein the second leg extends upwardly into the passageway restraining further movement of the sphere through the passageway, and in the second extreme position the second leg extends substantially below the body passageway permitting a sphere resting on the cradle to roll off and out of the body, the first leg extending upwardly in the passageway blocking passage of spheres therethrough, and a handle affixed to the shaft exteriorly of the body for selectable pivotation of the cradle for sequential launching of the spheres.

In a more limited sense the invention pertains to a sphere launching device including an integral check valve for closing the storage barrel to permit loading the barrel with spheres.

Referring now to the drawings and first to FIGURE 1, a sphere launching station is shown. A launching barrel 10 is positioned in a pipeline such as by means of flanges 12. In a sense the launching barrel 10 forms an integral part of the pipeline and receives flow fluid or gas therethrough.

The sphere launching station includes a storage barrel 14 mounted above and inclined generally towards the launching barrel 10. The purpose of the storage barrel 14 is to receive a number of spheres 16 therein for sequential launching into the pipeline system. Storage barrel 10 is provided with a closure member 18 by which spheres may be positioned within the interior of the barrel.

The launching barrel 10 and storage barrel 14 are more or less standard components of sphere launching stations. The improved third element of the sphere launching station of this invention is the sphere launching device itself, generally indicated by the numeral 20, which receives at the end the barrel 14 and connects, such as by means of a length of pipe 22, the launching barrel 10.

The sphere launching device 20 of FIGURE 1 is a composite device constituting both a sphere launcher and a check valve to close the loading barrel 14 when additional spheres are being deposited. In its basic essentiality this invention involves an improved sphere launcher which may be provided with or without the integral check valve and for this reason the invention will be first described without the check valve, reference being had to FIGURES 3 through 6.

FIGURE 3 illustrates the essence of the sphere launcher of this invention and includes a body 24 having a passageway 26 therethrough of a diameter to permit free passage of spheres 16. Body 24 has a closed lower recess 28 intermediate its length. One end 30 of the body 24 is adapted for connection to storage barrel 14 (see FIGURE 4) and the other end 32 is adapted for connection to a pipeline. Some type of shut-off, such as a check valve (not shown), is necessary between the sphere launcher 20 and the pipeline so that the storage barrel can be opened for refilling.

A shaft 34 is rotatably supported in recess 28 in a plane perpendicular the passageway 26. As shown in FIGURE 6, the ends 36 of the shaft extend externally of the body and are sealed with packing devices 37. While both ends 36 of shaft 34 are shown extended from the body it is only necessary that one end extend.

Recess 28 is closed at its lower end such as by a flange 38 to which is bolted a blind flange 40. Removal of blind flange 40 provides means of access to the interior of the body 24 facilitating access for repair after the launcher has been secured to a pipeline system in a launching station.

A cradle member, generally indicated by the numeral 42, is affixed to and pivoted by the shaft 34. The cradle member 42 has a first arm portion 44 and a second oppositely extending arm portion 46, the first arm portion 44 extending in the direction towards the end 30 of the body to which the launching barrel 14 is attached and the second arm portion 46 extending in the direction towards end 32.

Arms 44 and 46 define, in a vertical plane of the axis of the body passageway, an obtuse V. Affixed exteriorly of the body to the extending shaft 34 is a handle 48 by which the cradle 42 may be pivoted (see FIGURE 6).

Cradle 42 is pivoted between two extreme positions as illustrated in FIGURES 3 and 5. When the cradle 42 is pivoted in one position, as shown in FIGURE 3, the first arm portion 44 is substantially completely received within recess 28. This permits a sphere 16 to roll upon the first arm portion 44 and to rest against the upwardly extending second arm portion 46. In the opposite extreme position of pivotation, as shown in FIGURE 5, the second arm portion 46 is substantially completely received within recess 28 permitting a sphere 16 resting on the cradle to pass off and out of the launcher.

As shown in FIGURE 6, the arm portions 44 and 46 may be formed of spaced members. In the illustration the arm portions consist of three spaced finger like elements designated 46A, 46B and 46C. This construction reduces the weight of the arm 44 and 46 and at the same time provides a substantially wide base to cradle the spheres 16.

As best illustrated in FIGURES 3, 4 and 5 in the preferred configuration of first arm portion 44 the forward edge 50 thereof is defined substantially as the segment of a circle having the center coincident with the axis of shaft 34. The importance of this is seen by comparing FIGURES 3, 4 and 5 which show a sequential movement of a sphere through the launching device. As shown in FIGURE 3 a sphere 16 rests upon the cradle 42 and is prevented from proceeding through the launching device 20 by the upwardly extending second arm portion 46. To launch a sphere all that is necessary is the pivotation of shaft 34 by means of handle 48 from the first extreme position of FIGURE 3 to the position of FIGURE 5. As the shaft 34, and thereby cradle 42, is pivoted the sphere 16 resting on the cradle is carried forward a slight amount permitting all of the other spheres 16 stored within the storage barrel 14 to roll forward. As they do the next sphere contiguous to the sphere located on the cradle 42 engages the forward edge 50 of first arm 44. As the cradle 42 is further pivoted from the intermediate position of FIGURE 4 to the position of FIGURE 5 the sphere 16 located upon the cradle passes off the cradle and out of the launching device. As seen in FIGURE 5 the next adjacent sphere to the one resting on the cradle and being launched is held against further passage by the forward edge 50 of the first arm 44.

After the launch of the sphere the cradle 42 may be left in either the position of FIGURE 3 or FIGURE 5 since in either position the spheres are prevented from further passage through the launching device. In order to launch the next sphere the cradle must be returned to the position of FIGURE 3. It is important to note that after the first engagement of a sphere with the forward edge 50 of first arm 44 until it is free to roll on the arm 44 the sphere is never forced rearwardly. By the unique arrangement of the launching device of this invention spheres within the storage barrel 14 move only in increments towards the launching barrel and are never forced rearwardly by the launching operations.

The launching device 20 has great advantages of simplicity, dependability and economy of construction but the primary advantage is that the spheres 16 are gently handled by the launching device eliminating damage or deformation of the spheres.

Referring again to FIGURES 1 and 2, an alternate emmodiment of the invention is shown wherein the sphere launcher 20 includes an integral check valve portion generally indicated by the numeral 52. In the embodiment of FIGURE 1 the lower recess may be permanently closed and an upper closure 54 is provided to afford access into the interior of the launch body 24. An upper recess 56 is provided formed partly by closure 54.

A valve seating surface 58 is formed within the body having the flow passageway 26 therethrough, the seating surface 58 being toward the end 30 to which is secured the storage barrel 14. A clapper shaft 60 is rotatably supported in the upper recess 56 and at least one end of the shaft 60 extends exteriorly of the body 24. In the preferred arrangement as shown, both ends extend exteriorly of the body. A valve clapper 62 is affixed to and pivoted by the shaft 60 within the body. The clapper 62 is pivoted between a first and a second extreme position. In the first position, as shown in FIGURE 1, the clapper 62 is fully received in the upper body recess 56 permitting the free passage of spheres 16 therethrough. Handle extension 64 is affixed to each exterior extending portion of shaft 60 and weights 66 are slidably attached. The weights 66 are adjusted on handle extensions 64 to overbalance clapper 62 when the clapper is in the upper or launch position. In the second extreme position of the clapper 62 (not illustrated) the clapper is pivoted substantially vertically and is in sealed engagement with the seating surface 58.

The clapper 62 is normally closed only when it is necessary to refill the storage barrel 14 with an additional number of spheres 16. Thus, in the usual case there are no spheres 16 within the launching station when it is necessary to close the clapper. In the event, for some emergency or other reason, it is necessary to close the clapper 62 while spheres are still in the storage barrel 14 this can be accomplished by forced movement of the clapper into the closure position which forces spheres rearwardly permitting the clapper to close against the seating surface 58.

As shown in FIGURE 1 the additional basic features making up the typical sphere launching station include a pressure release opening 68 in the storage barrel 14 adjacent the upper outer end. A bleeder valve 70 closes the opening 68. Valve 70 affords means of discharging any pressure accumulation within the barrel prior to opening the closure 18. A gauge 72 may be provided as a safety feature to indicate when the pressure within the storage barrel 14 has been completely discharged.

The storage barrel 14 has an additional small diameter opening 74 in the lower surface and adjacent the launch body 24. A drain valve 76 closes the opening 74 and provides means whereby any fluid which may be trapped in the barrel 14 when the clapper 62 is closed may be drained away permitting easier placement of additional spheres into the barrel. Piping 78 may be provided from valve 76 to convey to a sump the fluid discharge from the barrel 14.

Barrel 14 is, as previously indicated, placed above the launching barrel 10 and must be downwardly inclined towards the sphere launching device 20. A brace 80 is provided to support the barrel 14.

While this invention has been described with a certain degree of particularly it is manifest that many changes may be made in the details of construction and the arrangement of components without departing from the spirit and scope of this disclosure. The disclosure has been made with reference to illustrated embodiments of the invention and the invention is not to be limited by

What is claimed:

1. A device for launching spheres into a pipeline comprising:
   a body having a passageway of a diameter to permit free passage of spheres therethrough, the body having a closed lower recess intermediate its length, one end of the body adapted to receive a sphere storage barrel and the other to connect to a pipeline;
   a horizontal shaft rotatably supported in the body recess below and substantially in a plane perpendicular the passageway, one end of the shaft extending sealably externally of the body;
   a cradle member affixed to and pivoted by said shaft within said body, the cradle member having oppositely extending arm portions defining, in a vertical plane of the body passageway axis, an obtuse V, the first leg of the cradle extending toward the end of the body adapted to receive the storage barrel and the second leg of the cradle extending toward the end of the body adapted for connection to a pipeline, the cradle pivoted by said shaft between a first and second extreme position, in the first position the first leg of the cradle lies substantially within the said lower recess permitting a sphere to roll onto the cradle and the second leg extending upwardly into the passageway, and in the second extreme position the second leg lies substantially within said lower recess permitting a sphere resting on the cradle to roll off and out of the body, the first leg extending upwardly in the passageway; and
   handle means affixed to the shaft externally of the body.

2. A device for launching spheres into a pipeline according to claim 1 wherein the outer edge of said first leg of said cradle is arcuately defined substantially as the segment of a circle having the center coincident with the axis of said shaft.

3. A device for launching spheres into a pipeline according to claim 1 wherein said body has a closed upper recess therein and including:
   a valve seating surface within said body having said passageway therethrough;
   a clapper shaft rotatably supported in the upper recess above the passageway, one end of the clapper shaft extending sealably externally of the body;
   a valve clapper affixed to and pivoted by said clapper shaft, the clapper pivotal between a first and second extreme position, in the first extreme position the clapper being fully received in said body upper recess permitting the free passage of spheres therebelow, and in the second extreme position the clapper sealing engages said valve seating surface;
   and handle means affixed to the clapper shaft externally of the body.

4. A station for launching spheres into a pipeline comprising:
   a launching barrel forming a portion of the pipeline, the launching barrel having a passageway therethrough an an upper passageway opening intermediate its length;
   a launcher body having a passageway of a diameter to permit free passage of spheres therethrough, the launcher body supported above and adjacent said launching barrel, the body having a closed lower recess intermediate its length;
   piping connecting the launching body at one end thereof to said upper passageway opening of said launching barrel, the piping of an internal diameter freely passing spheres therethrough;
   a tubular storage barrel affixed to the other end of said launcher body, the storage barrel adaptable to receive a plurality of spheres therein, the storage barrel inclined upwardly whereby spheres placed therein roll toward said launcher body;
   a sealable closure adjacent the end of said launcher barrel whereby spheres may be loaded into the barrel;
   a horizontal shaft rotatably supported in the body recess below and substantially in a plane perpendicular the passageway, one end of the shaft extending sealably externally of the body;
   a cradle member affixed to and pivoted by said shaft within said body, the cradle member having oppositely extending arm portions defining, in the vertical plane of the body passageway axis, an obtuse V, the first leg of the cradle extending toward the end of the body connected to the storage barrel and the second leg of the cradle extending toward the end of the body connected to said piping, the cradle pivoted by said shaft between a first and second extreme position, in the first extreme position the first leg of the cradle lying substantially within said lower recess permitting a sphere to roll onto the cradle and the second leg extends upwardly into the passageway, and in the second extreme position the second leg lying substantially within said lower recess permitting a sphere resting on the cradle to roll off and out of the body, the first leg extending upwardly in the passageway; and
   handle means affixed to the shaft externally of the body.

5. A sphere launching station according to claim 4 wherein the outer edge of said first leg of said cradle is arcuately defined substantially as the segment of a circle having the center coincident with the axis of said shaft.

6. A sphere launching station according to claim 4 wherein said body has a closed upper recess therein and including:
   a valve seating surface within said body having said passageway therethrough;
   a clapper shaft rotatably supported in the upper recess above the passageway, one end of the clapper shaft extending sealably externally of the body;
   a valve clapper affixed to and pivoted by said clapper shaft, the clapper pivotal between a first and second extreme position, in the first extreme position the clapper being received in said body upper recess permitting the free passage of spheres therebelow, and in the second pivoted position the clapper sealing engages said valve seating surface; and
   a handle means affixed to the clapper shaft externally of said body.

7. A sphere launching station according to claim 4 wherein said storage barrel has a small diameter opening in the wall thereof adjacent said closure and including a bleeder valve closing said small diameter opening whereby pressure accumulation in said barrel may be bled off.

8. A sphere launching station according to claim 4 wherein said storage barrel has a small diameter opening in the lower surface of the wall thereof adjacent said launcher body, and including a drain valve closing said opening whereby fluid accumulation within said storage barrel may be discharged.

References Cited by the Examiner

UNITED STATES PATENTS

| | | | |
|---|---|---|---|
| 1,958,956 | 5/1934 | Preston | 221—301 X |
| 3,169,263 | 2/1965 | Eagleton | 15—104.06 |

FOREIGN PATENTS 374,052  5/1932  Great Britain.

CHARLES A. WILLMUTH, *Primary Examiner.*

E. L. ROBERTS, *Assistant Examiner.*